United States Patent

[11] 3,588,526

[72] Inventor James Ronald Cricchi
Catonsville, Md.
[21] Appl. No. 813,442
[22] Filed Apr. 4, 1969
[45] Patented June 28, 1971
[73] Assignee Westinghouse Electric Corporation
Pittsburgh, Pa.

[54] SHIFT REGISTER USING METAL OXIDE SILICON TRANSISTORS
12 Claims, 4 Drawing Figs.

[52] U.S. Cl. 307/221, 307/251, 307/304, 328/37
[51] Int. Cl. G11c 19/00
[50] Field of Search 307/221, 304, 205, 251, 279, 246; 328/37

[56] References Cited
UNITED STATES PATENTS

| | | | |
|---|---|---|---|
| 3,260,863 | 7/1966 | Burns et al. | 307/205 |
| 3,395,292 | 7/1968 | Bogert | 307/221 |
| 3,406,346 | 10/1968 | Wanlass | 307/221X |
| 3,449,594 | 6/1969 | Gibson et al | 307/304X |
| 3,483,400 | 12/1969 | Washizuka et al. | 307/221X |
| 3,509,379 | 4/1970 | Rapp | 307/279 |

OTHER REFERENCES

SIDORSKY, MTOS SHIFT REGISTERS, General Instrument Corporation Application Notes, December 1967, pp. 1—7. 307/221

*Primary Examiner*—Stanley T. Krawczewicz
*Attorneys*—F. H. Henson and E. P. Klipfel

ABSTRACT: A two-stage shift register circuit for an *n* bit shift register comprised of a metal oxide silicon transistor (MOST) array of a single-type semiconductivity wherein each stage includes a load MOST and a switching MOST and wherein a separate gating MOST is coupled to each load and switching MOST of both stages and operated from a four-phase synchronized clock source so that the load and switching MOST in each stage are operated in push-pull relationship for reducing the power drawn during static conditions and reducing the propagation time from the input and output of each bit.

PATENTED JUN 28 1971 3,588,526

INVENTOR
JAMES RONALD CRICCHI

BY Ernest P. Klipfel
ATTORNEY

SHIFT REGISTER USING METAL OXIDE SILICON TRANSISTORS

BACKGROUND OF THE INVENTION

The present invention relates in general to microelectronic devices and more particularly to an electrical signal translation circuit employing integrated circuit elements such as field effect transistors embodied in a single semiconductor body monocrystaline substrate. The construction of field effect transistors more correctly referred to as metal oxide induced channel field effect transistors or simply MOST is well known to those skilled in the art. It should be observed that either an N- or a P-type semiconductivity substrate may be employed, but the induced channel MOST fabricated therein operates like a transistor having opposite P or N semiconductivity, respectively. That is to say, the MOST devices fabricated on an N-type substrate are said to be P-channel MOST devices and vice versa. Each MOST include a gate electrode, a source electrode and a drain electrode. Furthermore, an enhancement mode MOST will turn ON, i.e., become conductive if either its source or drain electrode is grounded and if its gate is fed a signal of proper polarity and having an amplitude greater than its gate-source threshold voltage. For example, each P-channel MOST has the characteristic that a closed circuit (ON) is established between the source and drain electrode when a negative potential greater than the threshold voltage is applied to its gate electrode while an open circuit (OFF) is established between the source and drain electrodes when the gate electrode is at ground potential. For a P-channel MOST, a negative potential is required to be applied to the gate electrode for turning it ON.

Shift register systems are well-known logic components. They may be characterized as systems which receive a data signal and, controlled by a shifting or clock signal, transfers that data signal to another system or bit of the same or different character. A plurality of bits may be connected together with the data signal finally emerging from the last bit after it has been shifted serially from bit to bit through the entire array. To enhance the speed of operation and reduce the size and power drain of such circuitry, the use of field effect transistors integrated into semiconductor substrates or "chips" has been realized. One such example is the shift register system described in U.S. Pat. No. 3,406,346 issued to F. M. Wanlass. In accordance with said patent, each shift register bit is composed of a pair of transfer stages serially connected between a system input terminal and a system output terminal. The data input signal is transferred from the system input terminal to the system output terminal in two steps, the first being transferred from the system input terminal to the first transfer stage and then from the first transfer stage to the second transfer stage, the system output terminal being connected to the second transfer stage. The sequential shifting of the input data is accomplished by a shift control signal composed of two alternatively operative parts or phases, the first phase effecting the first shift of the input data to the first transfer stage and the second phase effecting the second shift to the second transfer stage. Once the shift cycle has been completed, a feedback or latching means becomes effective to retain the transfer stages in their existing conditions until the next operating cycle occurs.

A second example of a shift register utilizing field effect transistors is described in U.S. Pat. No. 3,395,292, issued to H. Z. Bogert. The shift register taught by the Bogert patent also includes two stages per bit with each stage including a switching field effect transistor and a drain load field effect transistor connected in series with one another. Each stage is sequentially clocked by a two-phase clock signal which sequentially operate the load and switching transistor both ON and OFF simultaneously during the signal transfer process.

The above-mentioned prior art apparatus while advancing the state of the art beyond former prior art shift register circuits, still nevertheless exhibits inherent limitations as to speed of operation and the required power drain during static conditions.

SUMMARY

The present invention is directed to an improved shift register circuit of the integrated circuit type wherein induced channel metal oxide semiconductor transistor or MOST devices are utilized and where each bit of the shift register is comprised of a first and a second stage each having a switching MOST and a drain load or simply load MOST connected in series and a respective gate MOST coupled to each load and switching MOST of both stages, with the gate MOST devices being respectively operated by a phase of a synchronized four-phase clock system so that the load and gate MOST of each stage are alternately conducting and nonconducting in mutual opposite relationship so that one is conducting while the other is nonconducting and vice versa which is effective in reducing the current drain of the devices in their static conditions and wherein the four-phase clock signals are related in time to enhance the propagation speed through each bit of the shift register. Since either the drain load MOST or the switching MOST of a stage is in a conductive state while the other is nonconductive, the succeeding stage is always driven from a low impedance source which further enhances the switching speed of operation.

DESCRIPTION OF THE PREFERRED EMBODIMENT

Figure 1:
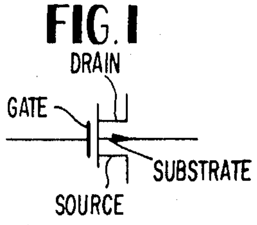
FIG. 1 is a schematic diagram of a P-channel MOST fabricated on a substrate of N-type semiconductor material.

Referring now to the FIGS. and more particularly to FIG. 1, there is disclosed a schematic representation of a P-channel metal oxide semiconductor transistor, (MOST) fabricated on a silicon substrate of N-type material. FIG. 1 is provided to schematically illustrate and define the electrodes of a MOST as the gate, source, drain, as well as the substrate. The gate, drain and source electrodes are analogous to the base, emitter, and collector electrodes of a conventional junction transistor.

Figure 2:
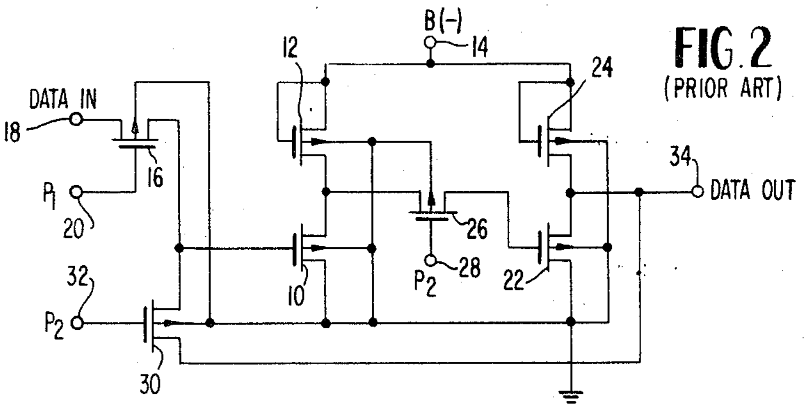
FIG. 2 is an electrical schematic diagram of an integrated circuit shift register which is illustrative of the known prior art.

Before proceeding to a detailed description of the preferred embodiment of the subject invention, attention is directed to FIG. 2, which is a schematic diagram of a typical integrated circuit shift register using MOST and which is typically representative of the prior art. Moreover, the circuit shown in FIG. 1 is similar to the shift register disclosed in the Wanlass patent, U.S. Pat. No. 3,406,346, with the exception that drain load MOST devices are employed in place of the fixed load resistors employed by the circuit shown in FIG. 1 of the Wanlass patent. The schematic diagram of FIG. 2 illustrates a shift register of one bit having a first stage comprised of a switching MOST 10 and a drain load MOST 12 coupled in series between a point of reference potential illustrated as ground and a source of power supply potential B−. The source electrode of MOST 10 is directly connected to ground while the drain is directly connected to the source electrode of MOST 12. The drain electrode of MOST electrode 12 is directly connected to a source of negative supply voltage B−, not shown, coupled to terminal 14. A first gating MOST 16 is coupled between data input means including terminal 18 and the gate electrode of MOST 10 of the first stage. The drain electrode of MOST 16 is connected to the input terminal 18 while the source is connected to the gate of MOST 10. The gate of MOST 16 is connected to terminal 20 which has applied thereto one phase $P_1$ to a two-phase synchronized clocking signal.

The second stage of the shift register bit is similar to the first stage and comprises a second switching MOST 22 and a second drain load MOST 24 coupled in series between ground and the B− supply terminal 14. The gates of both load MOST 12 and 24 are returned to the B− supply. A second gating MOST 26 couples the first stage to the second stage by having the drain electrode of MOST electrode 26 connected to the common connection between the first switch MOST 10 and the load MOST 12 while the source electrode of the second switching MOST 26 is coupled to the gate electrode of the second gating MOST 22. A second clock signal comprising the second phase $P_2$ of a synchronized clock signal with respect to the phase $P_1$ is applied to the gate electrode of MOST 26 by means of the terminal 28. A feedback or latching MOST 30 is coupled between the drain and source of MOST 22 and 24, respectively, back to the gate of the first gate MOST 10 and the source electrode of the first gating MOST 16. A clock signal corresponding to the second phase signal $P_2$ is applied to the gate of the feedback MOST 30 by means of terminal 32. Finally, a data signal output means including terminal 34 is coupled to the common connection between the drain of the second gating MOST 22 and the source electrode of the second drain load MOST 24. All of the MOST devices shown in the prior art embodiment of FIG. 2 are P-channel enhancement mode devices fabricated on an N-type semiconductor substrate which is grounded to prevent forward biasing of any junctions.

Briefly, the operation of the embodiment shown in FIG. 2 is as follows. During a shift cycle, negative voltages comprising the two phases $P_1$ and $P_2$ of the clock or shift control signal are alternately and sequentially applied to the gate electrodes of the first and second gating MOST 16 and 26 so as to first close the first gating MOST 16 while keeping the second gating MOST 26 open and then to close the second gating MOST 26 after the first gating MOST 16 has opened. When the first gating MOST 16 is closed, the data signal appearing at the data input terminal 18 is transferred to the first stage and more particularly, to the gate of the first gate MOST 10 where it will either simultaneously turn both the switching MOST 10 and its load MOST 12 ON or OFF. When the first gating MOST 16 opens, the second gating MOST 26 closes. When this occurs, the data signal now appearing at the drain electrode of the switching MOST 10 is transferred to the gate electrode of the second switching MOST 22. Meanwhile, the first stage is disconnected from the data input terminal 18. After the first stage has been thus disconnected from the data input terminal 18, the output of the second stage which appears at the drain electrode of the second switching MOST 22, the nature of which is determined by the character of the data signal shifted thereto, is fed back to the first stage thus latching both stages in appropriate condition depending upon the nature of the operative data signal. The second phase signal $P_2$ of the clocking or shift control signal which closes the switching the second switching MOST 26 between the first and second stages also controls the feedback circuit by means of the latching MOST 30.

What is significant about the shift register shown in FIG. 2 is that in a static condition, both MOST devices connected in series between B− and ground, i.e., the switching MOST and the drain load MOST, respectively, of either the first or second stage are either simultaneously ON or OFF. Thus, if the first stage is ON, current will be continuously drawn from the B− supply through the switching MOST 10 and the load MOST 12 to ground. Also, the two-phase clocking of the circuit establishes a finite maximum switch rate due to the fact that the phases are alternatively and sequentially applied to the gating MOST devices 16 and 26.

Figure 3:
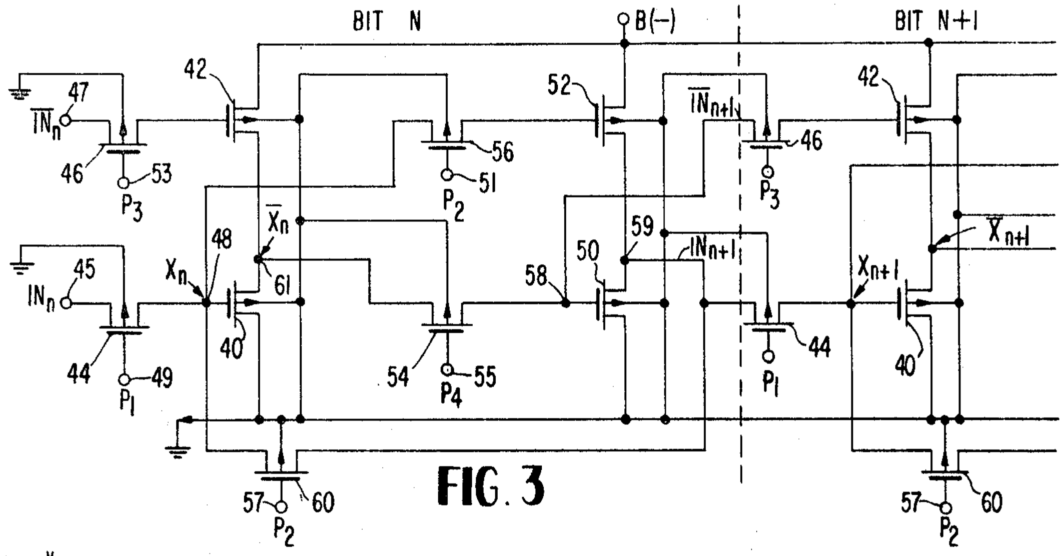
FIG. 3 is an electrical schematic diagram of a preferred embodiment of the subject invention.

Directing attention now to the improved MOST shift register comprising the subject invention, attention is directed to FIG. 3 wherein push-pull operation of the switching MOST and the drain load MOST of a two-stage shift register is achieved by providing separate clock signals to the switching MOST and its associated drain load MOST by means of a four-phase clock system such that the drain load MOST is OFF when the switching MOST is ON and secondly such that the load MOST is ON when the switching MOST is OFF. More particularly, the preferred embodiment of the present invention is comprised of an array of enhancement mode P-channel MOST devices fabricated on a substrate of N-type semiconductor material which is grounded to prevent forward biasing of any junctions. Furthermore, the enhancement mode devices have threshold voltages that are substantially zero volts to minimize any deterioration of the amplitude of signal being translated through the shift register. Each bit of a multiple bit shift register is comprised of two stages including first and second switching MOST 40 and 50 serially connected to respective first and second drain load MOST 42 and 52 which are operated as source followers. A first and second gate MOST 44 and 54 respectively, gate the transfer of an input signal $IN_n$ from input terminal 45 to the gate electrode of the first switching MOST 40 and from the drain of the switching MOST 40 to the gate electrode of the second switching MOST 50 in a manner similar to the prior art embodiment shown in FIG. 2. However, in the present embodiment, a third gating MOST 46 couples the complement of the input signal $\overline{IN}_n$ from a second input terminal 47 to the gate electrode of the first drain load MOST 42 and a fourth gating MOST 56 couples the junction 48, common to the gate electrode of the first switching MOST to the gate electrode of the second drain load MOST 52. Completing the description of each bit, a feedback MOST 60 is coupled from the drain electrode of the second switching MOST 50 and the source electrode of the load MOST 52 back to the gate electrode of the first switching MOST 40 at junction 48. The junction 59 which is common to the drain electrode of the second switching MOST comprises the output means which is coupled to the following $n+1$ bit. Each of the gating MOST devices, 44, 46, 54, and 56 are controlled by a separate phase signal of a four-phase clock system such that the first-phase clock signal $P_1$ is applied to the gate of the first gating MOST 44 by means of terminal 49 while the other three-phase clock signals $P_2$, $P_3$ and $P_4$ are respectively applied to the fourth gating MOST 56, the third gating MOST 46, and the second gating MOST 54 by means of terminals 51, 53 and 55. The second-phase clock signal $P_2$ is also applied to the feedback MOST 60 by means of terminal 57.

Although the present embodiment id described utilizing enhancement mode devices exclusively, it should be pointed out that it is possible to integrate both enhancement mode and depletion devices in the same array. Therefore, when desirable the load MOST 42 and 52 could be comprised of depletion mode devices while all the other elements being enhancement mode devices to minimize the deterioration of the amplitude of the signal propagating through MOST 42 and 52. Such a configuration would increase the power dissipation but by a negligible amount.

As noted earlier an enhancement mode device is one that is normally OFF ($Ids \cong 0.$) when the gate to source voltage is less than the threshold voltage. However, in a depletion mode device a drain to source current defined as $Idss$ flows when the gate to source voltage is zero. It is only when the gate to source voltage is equal to the pinch off voltage ($V_p$) that the device is OFF ($Ids \cong 0.$).

Figure 4:
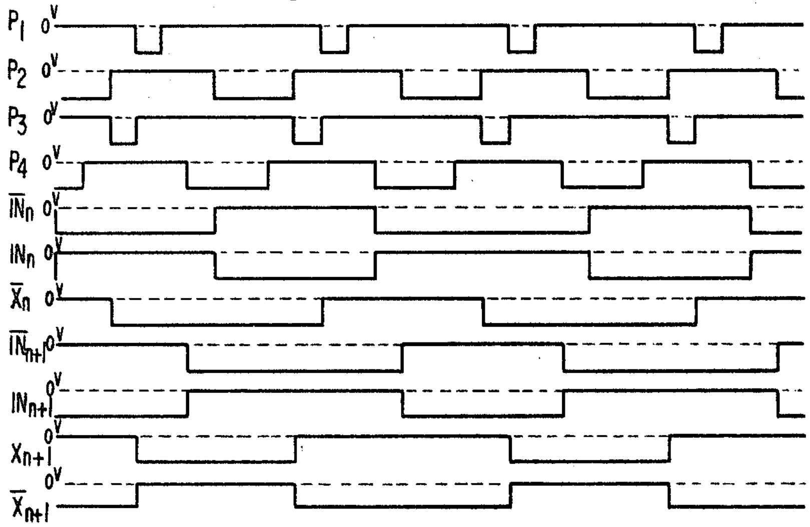
FIG. 4 is a timing diagram of typical time related waveforms present at selected points of the embodiment shown in FIG. 3.

The synchronization of the four-phase clock signals $P_1$, $P_2$, $P_3$, $P_4$ utilized by the present invention is illustrated by the waveforms so designated on the timing diagram in FIG. 4. These waveforms depict the transfer of the input signal $IN_n$ and its complement $\overline{IN}_n$ from the input terminals 45 and 47, respectively, to the junction 59 and 58 which are connected to the bit $n+1$. During the shifting cycle the switching MOST and its associated drain load MOST of each stage of the two stages are alternately ON and OFF with one being ON while the other is OFF. For example by referring to the waveforms of FIG. 4, it can be seen that initially the input signal $IN_n$ switches from a negative potential to zero potential or ground. Following this the clock signal $P_4$ goes from a negative potential to ground which turns the second switching MOST 54 OFF due to the fact that a P-channel field effect device must be operated with a negative supply potential applied to its drain electrode and has the characteristic that a closed circuit is established between the drain and source electrodes when a suitable negative potential is applied to its gate electrode while an open circuit is established therebetween when the gate electrode is at ground potential. Next in time clock signal $P_3$ goes negative while clock signal $P_2$ goes to ground potential, at which time the third gating MOST 46 turns ON applying the input $\overline{IN}_n$ to the gate of the first drain load MOST 42 and thereby turning it ON. The potential at junction 61 immediately goes negative to substantially the B− potential less the voltage drop across the drain-source junction of MOST 42. This is evidenced by the waveform $\overline{X}_n$ of FIG. 4. Meanwhile, the clock signal $P_2$ turns the feedback MOST 60 OFF which had been maintaining the first switching MOST 40 in its previous state. In addition, the clock signal $P_2$ turns the fourth gating MOST 56 OFF disconnecting junction 48 from the gate of the load MOST 52. At the next time interval, the clock signals $P_4$ and $P_2$ remain at ground potential while the clock signal $P_3$ goes from a negative potential to ground while the signal $P_1$ goes from ground to a negative potential. This turns the third gating MOST 46 OFF while turning the first gating MOST 44 ON to couple the input signal $IN_n$ to the gate of first switching MOST 40. Since the input signal $IN_n$ is presently at ground potential and the first switching MOST 40 was in an OFF condition, it will remain OFF and the waveform at terminal 61 remains the same as evidenced by the waveform $\overline{X}_n$. The next thing that occurs is that the clock signal $P_1$ returns to ground potential turning the first gating MOST 44 OFF thus disconnecting junction 48 from the input terminal 45. The operating conditions of the first stage MOST devices 40 and 42, however, do not change. Following this, transfer from the first to the second stage is achieved by turning ON the second gating MOST 54 by means of the clock signal $P_4$ which goes to a negative potential. Since the waveform $\overline{X}_n$ appearing at junction 61 is a negative potential, the second switching MOST 50 turns ON while the second drain load MOST 52 will remain OFF due to the coupling back to junction 48. The last sequence occurs when the clock signal $P_2$ goes negative turning ON the feedback MOST 60 and the fourth gating MOST 56 ON for holding the conductive states of the MOST devices in their previously switched states. Also at the time that the clock signal $P_2$ goes negative the inputs $IN_n$ and $\overline{IN}_n$ change in preparation for the succeeding shifting cycle wherein the process repeats but in the opposite sense. It is significant to note, however, that the switching MOST and its load MOST always exist in mutually opposite conductive states.

It should be observed that the input of any switching most 40 or 50 will be driven from a low resistance source because of the fact that one of the MOST devices of the proceeding stage will be ON or conducting. Stated another way, both MOST devices of any particular stage are never simultaneously conductive since the load MOST of the first stage is conductive when the switching MOST of the second stage is also conductive and vice versa. Since the propagation time of the stage is primarily determined by the drain load resistance and capacity being driven the low resistance of the preceding load MOST when ON results in smaller propagation time. Thirdly, the delay inherently caused by each stage of the shift register bit is compensated for by the phase differences between the respective clock signals $P_1$—$P_4$ as shown in FIG. 4.

While there has been shown and described what is at present considered to be the preferred embodiment of the subject invention, it should be observed that modifications thereto will readily occur to those skilled in the art. For this reason it is not desired that the detailed description of the present invention be interpreted in a limited sense since all modifications, alterations and equivalents coming within the spirit and scope of the present invention are herein meant to be included.

I Claim as my Invention:

1. An electrical signal translation circuit in the configuration of a two-stage shift register employing a plurality of semiconductor switches having an input electrode and a first and a second output electrode and powered by a supply potential from a power supply source and controlled by a clock source providing a plurality of synchronized clock signals, comprising in combination:

a first and second stage including a first and second and a third and fourth semiconductor switch, respectively, coupled together and including circuit means such that the first output electrode of said first and third switch is coupled to a point of reference potential, the second output electrode of said first and third semiconductive switch is respectively coupled to the first output electrode of said second and fourth semiconductor switch, and the second output electrode of said second and fourth semiconductor switch is coupled to said supply potential;

a pair of input and a pair of output means;

a fifth semiconductor switch coupled between the input electrode of said first semiconductor switch of the first stage and one input means of said pair of input means by means of the first and second output electrode thereof;

a sixth semiconductor switch coupled between the input electrode of said semiconductor switch of the first stage and the second input means of said pair of input means by means of the first and second output electrodes thereof;

a seventh semiconductor switch coupled between the input electrode of said third semiconductor switch of the second stage and the second output electrode of said first semiconductor switch of the first stage by means of the first and second output electrode thereof;

an eighth semiconductor switch coupled between the input electrode of said fourth semiconductor switch of the second stage and the input electrode of said first semiconductor switch of the first stage by means of the first and second output electrode thereof;

a ninth semiconductor switch of the second stage and the input electrode of said first semiconductor switch of said first stage by means of the first and second output electrodes thereof;

circuit means coupling one output means to said second output electrode of said third semiconductor switch of the second stage and the other output means to the input electrode of said third semiconductor switch of the second stage;

a first clock signal of said plurality of synchronized clock signals coupled from said clock signal source to the input electrode of said fifth semiconductor switch;

a second clock signal of said plurality of clock signals coupled to the input electrodes of said eighth and ninth semiconductor switches;

a third clock signal of said plurality of clock signals coupled to the input electrode of said sixth semiconductor switch; and a fourth clock signal coupled to the input electrode of said seventh semiconductor switch, said first, second, third and fourth clock signals being applied in timed relationship to transfer complementary input signals respectively from said pair of input means to said pair of output means by successive operative effects wherein said first and second, and said third and fourth semiconductor switches are in mutually opposite conductive or nonconductive states depending on the nature of the signals coupled to the respective input electrodes.

2. The invention as defined by claim 1 wherein said semiconductor switches are comprised of transistors.

3. The invention as defined by claim 1 wherein said semiconductor switches are comprised of field effect devices.

4. The invention as defined by claim 1 wherein said semiconductor switches comprise field effect transistors including a gate, source and drain electrode, fabricated on a semiconductor substrate and wherein said input electrode comprises the gate electrode, the first output electrode comprises the source electrode and the second output comprises the drain electrode.

5. The invention as defined by claim 4 and additionally including means for coupling said substrate to said point of reference potential.

6. The invention as defined by claim 4 wherein said field effect transistors are comprised of enhancement mode field effect transistors.

7. The invention as defined by claim 4 wherein said field effect transistors are comprised of induced channel metal oxide field effect transistors having a first type semiconductivity fabricated on a substrate having the opposite semiconductivity.

8. The invention as defined by claim 4 wherein said field effect transistors are comprised of enhancement mode and depletion mode field effect transistors.

9. The invention as defined by claim 7 wherein the substrate comprises silicon of a predetermined semiconductivity and said field effect transistors are enhancement mode-type field effect transistors of opposite semiconductivity.

10. The invention as defined by claim 8 wherein said field effect transistors are P-channel field effect transistors.

11. The invention as defined by claim 9 wherein said substrate is comprised of N-type semiconductor material.

12. The invention as defined by claim 1 wherein said second and fourth semiconductor switches are comprised of depletion mode field effect transistors and all other said semiconductor switches are comprised of enhancement mode field effect transistors.